US009514075B2

(12) United States Patent
Sip

(10) Patent No.: US 9,514,075 B2
(45) Date of Patent: Dec. 6, 2016

(54) ELECTRONIC SYSTEMS, HOST ELECTRONIC DEVICES, ELECTRONIC DEVICES AND COMMUNICATION METHODS

(71) Applicant: Acer Incorporated, Taipei Hsien (TW)

(72) Inventor: Kim Yeung Sip, Taipei Hsien (TW)

(73) Assignee: ACER INCORPORATED, New Taipei (TW)

( * ) Notice: Subject to any disclaimer, the term of this patent is extended or adjusted under 35 U.S.C. 154(b) by 849 days.

(21) Appl. No.: 13/677,882

(22) Filed: Nov. 15, 2012

(65) Prior Publication Data

US 2013/0275635 A1     Oct. 17, 2013

(30) Foreign Application Priority Data

Apr. 16, 2012   (TW) .............................. 101113412 A

(51) Int. Cl.
| | |
|---|---|
| *G06F 13/38* | (2006.01) |
| *H04L 12/54* | (2013.01) |
| *H04N 7/01* | (2006.01) |
| *G06F 13/42* | (2006.01) |

(52) U.S. Cl.
CPC .......... *G06F 13/382* (2013.01); *G06F 13/385* (2013.01); *G06F 13/4247* (2013.01); *H04L 12/56* (2013.01); *H04N 7/01* (2013.01)

(58) Field of Classification Search
CPC ........ G06F 13/382; G06F 15/16; H04L 12/56; H04N 7/01
USPC .......................................... 710/105; 370/389
See application file for complete search history.

(56) References Cited

U.S. PATENT DOCUMENTS

| | | | | | |
|---|---|---|---|---|---|
| 5,274,800 | A | * | 12/1993 | Babb ...................... | G06F 13/37 714/32 |
| 7,752,353 | B2 | * | 7/2010 | Perry ...................... | G06F 13/24 710/268 |
| 8,105,108 | B2 | * | 1/2012 | Vroom et al. ............. | 439/540.1 |

(Continued)

FOREIGN PATENT DOCUMENTS

TW            200923902          6/2009

OTHER PUBLICATIONS

European Search Report dated May 7, 2013.

(Continued)

*Primary Examiner* — Henry Tsai
*Assistant Examiner* — Christopher a Daley
(74) *Attorney, Agent, or Firm* — McClure, Qualey & Rodack, LLP

(57) ABSTRACT

An electronic system is provided, including a host electronic device and a first electronic device. The host electronic device is coupled to a mini display port (mDP) bus composed of a first lane and a second lane, in which the host electronic device turns off the second lane according to a disable signal in a first communication protocol mode. The first electronic device is coupled to the mDP bus and outputs a detection signal to the host electronic device, in which, when the first electronic device is coupled to the host electronic device, the host electronic device communicates with the first electronic device through the first lane in the first communication protocol mode and communicates with the first electronic device through the second lane in a second communication protocol mode, according to an enable signal.

9 Claims, 4 Drawing Sheets

(56) References Cited

U.S. PATENT DOCUMENTS

| | | | |
|---|---|---|---|
| 8,806,077 B2* | 8/2014 | Takiduka | G09G 5/006 |
| | | | 386/200 |
| 2008/0084834 A1* | 4/2008 | Stanek | G06F 13/385 |
| | | | 370/284 |
| 2008/0172501 A1 | 7/2008 | Goodart et al. | |
| 2009/0117754 A1 | 5/2009 | Fields et al. | |
| 2009/0153574 A1 | 6/2009 | Chou et al. | |
| 2009/0178097 A1* | 7/2009 | Kim | G06F 3/14 |
| | | | 725/114 |
| 2010/0183004 A1* | 7/2010 | Kobayashi | 370/389 |
| 2011/0080342 A1* | 4/2011 | Haren | G06F 3/038 |
| | | | 345/163 |
| 2011/0141351 A1* | 6/2011 | Yan | 348/445 |
| 2011/0170011 A1* | 7/2011 | Choi | H04N 5/38 |
| | | | 348/725 |
| 2012/0075667 A1* | 3/2012 | Kamata | H04L 67/1097 |
| | | | 358/1.15 |
| 2012/0117179 A1* | 5/2012 | Agnihotri et al. | 709/208 |
| 2013/0104122 A1* | 4/2013 | Lin | G06F 13/102 |
| | | | 717/176 |
| 2013/0235039 A1* | 9/2013 | Montag | 345/428 |
| 2014/0253564 A1* | 9/2014 | Redman et al. | 345/502 |

OTHER PUBLICATIONS

Taiwanese language office action dated May 23, 2014.
English language translation of abstract of TW 200923902 (published Jun. 1, 2009).

* cited by examiner

ELECTRONIC SYSTEMS, HOST
ELECTRONIC DEVICES, ELECTRONIC
DEVICES AND COMMUNICATION
METHODS

CROSS REFERENCE TO RELATED
APPLICATIONS

This application claims priority of Taiwan Patent Application No. 101113412, filed on Apr. 16, 2012, and the entirety of which is incorporated by reference herein.

BACKGROUND OF THE INVENTION

Field of the Invention

The present invention relates to an electronic system, and in particular, relates to an electronic system with a mini display port (mDP).

Description of the Related Art

As computer and information technology industries continue developing, new peripheral equipment has been developed for connection to personal computers and notebook computers, including Internet network devices and external storage devices. Nevertheless, the traditional system architectures operating on the personal computers and notebook computers can not perform data communication with new communication protocols. Thus an electronic system and a communication method thereof are in need for increasing usability of the electronic system.

BRIEF SUMMARY OF THE INVENTION

In one aspect of the invention, an electronic system is disclosed, comprising a host electronic device and a first electronic device. The host electronic device is coupled to a Mini Display Port (mDP) bus comprising a first channel and a second channel, wherein when in a first communication protocol mode, the host electronic device disconnects the second channel, according to a disable signal. The first electronic device, coupled to the mDP bus, is configured to output a detection signal to the host electronic device. When the first electronic device is coupled to the host electronic device, the host electronic device communicates with the first electronic device in the first communication protocol mode via the first channel, and communicates with the first electronic device in the second communication protocol mode via the second channel, according to an enable signal.

In another aspect of the invention, a host electronic device is provided, comprising a processing unit, a multiplexer and an embedded control unit. The processing unit is coupled to a first channel of an mDP bus. The multiplexer is configured to couple a second channel of the mDP bus to a ground level according to a disable signal in a first communication protocol mode. The embedded control unit is coupled to the multiplexer, wherein when the host electronic device is coupled to a first electronic device, the multiplexer is configured to couple the second channel to the embedded control unit according to an enable signal, so that the processing unit is configured to communicate with the first electronic device in the first communication protocol via the first channel, and the embedded control unit is configured to communicate with the first electronic device in a second communication protocol mode via the second channel.

In another aspect of the invention, another electronic device is described, comprising a processing unit and an embedded control unit. The processing unit, coupled to a first channel of an mDP bus, is configured to output a detection signal to a host electronic device, and communicate with the host electronic device in a first communication protocol mode. The embedded control unit, coupled to the second channel, is configured to communicate with the host electronic device in a second communication protocol mode.

BRIEF DESCRIPTION OF DRAWINGS

The invention can be more fully understood by reading the subsequent detailed description and examples with references made to the accompanying drawings, wherein.

DETAILED DESCRIPTION OF THE
INVENTION

A detailed description is given in the following embodiments with reference to the accompanying drawings.

Figure 1:
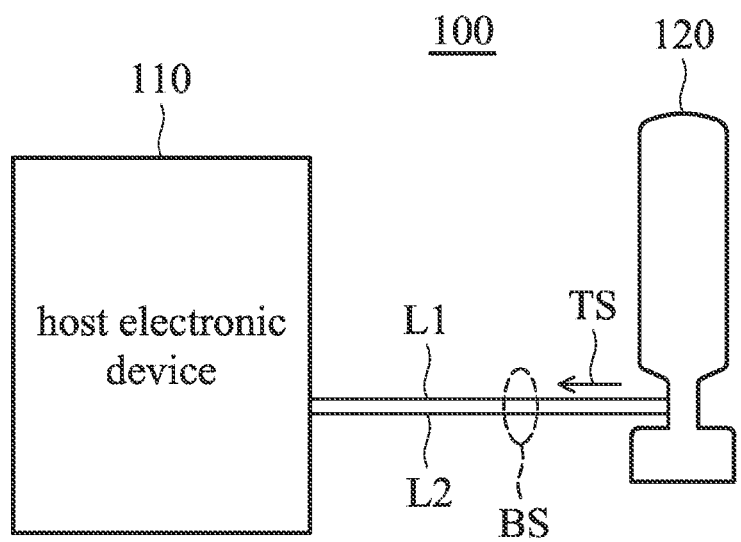
FIG. 1 is a block diagram of an electronic system 100 according to an embodiment of the invention.

FIG. 1 is a block diagram of an electronic system 100 according to an embodiment of the invention. The electronic system 100 includes a host electronic device and an electronic device 120. Specifically, the host electronic device 110 is coupled to a mini display port (mDP) including a first channel L1 and a second channel L2. In a first communication protocol such as a thunderbolt protocol mode, the host electronic device 110 can disconnect the second channel L2 according to a disable signal DS. In the embodiment, the first channel L1 is formed by three lanes, or, the first channel L1 contains lanes LANE0, LANE1, and LANE2. Each lane LANE0, LANE1, or LANE2 can include a p line and an n line. The first channel L1 contains 6 lines, namely, LAN0($p$), LAN0($n$), LAN1($p$), LAN1($n$), LAN2($p$) and LAN2($n$). The second channel L2 is formed by one lane, or lane LANE3. LANE3 contains a p line and an n line, thereby consequently, the second channel L1 can contain 2 lines, or LAN3($p$) and LAN3($n$).

The electronic device 120, coupled to the mDP bus BS, is configured to output a detection signal TS to the host electronic device 110. When the electronic device 120 is coupled to the host electronic device 110, the host electronic device 110 can communicate with the electronic device 120 in the first communication protocol mode via the first channel L1, and open the second channel L2 according to an enable signal ES, so that the host electronic device 110 can communicate with the electronic device 120 in a second communication protocol mode such as an I2C (Inter-Integrated Circuit, I2C) protocol mode via the second channel L2.

In the embodiment, the host electronic device 110 can be an electronic device with various configurations, for example, a hand-held device, a portable device, a personal digital assistant (PDA), a multi-processor system, a microprocessor-based or programmable consumer electronic device, a network computer, a mini computer, a server computer or the like, and is not limited thereto.

The electronic device 120 can be any type of peripheral devices or Input/Output (I/O) expanders. For instance, the electronic device 120 may be a TV box, an optical disk drive, a Hard disk driver (HDD), a graphics processing unit (GPU) device or a speaker. It should be understood that the electronic device 120 may be any electronic device with the thunderbolt interface, electronic device with a data transfer rate exceeding the thunderbolt interface, or electronic device with a daisy chain configuration.

Figure 2:
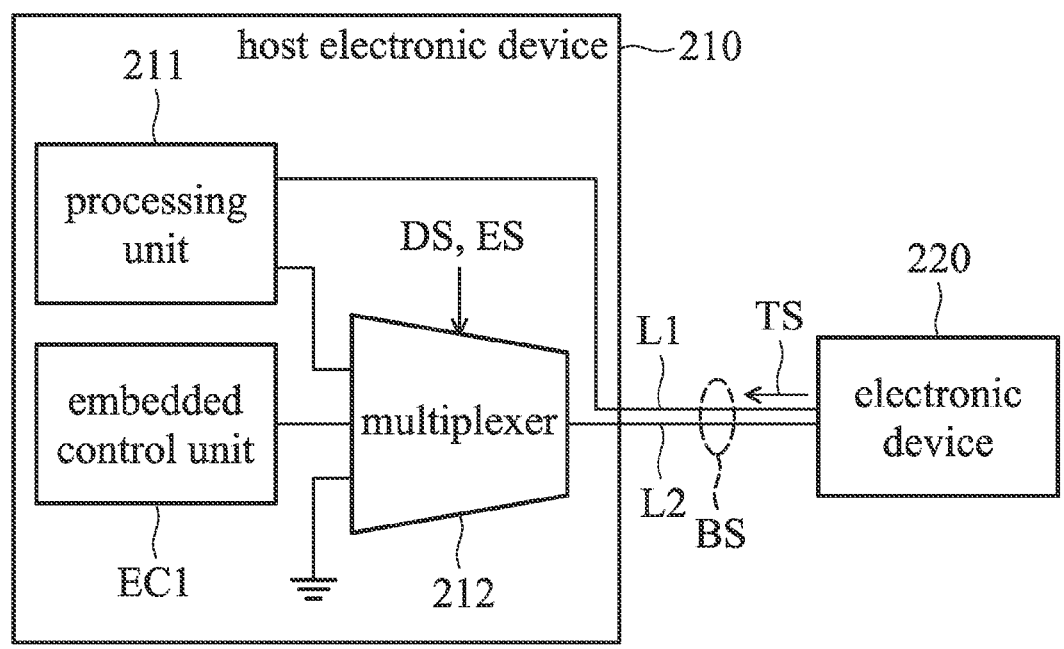
FIG. 2 shows a block diagram of a host electronic device according to an embodiment of the invention.

FIG. 2 shows a block diagram of a host electronic device according to an embodiment of the invention, with the host electronic device 210 identical to the host electronic device 110 in FIG. 1. As depicted in FIG. 2, the host electronic device 210 contains a processing unit 211, a multiplexer 212, and an embedded control unit EC1. The processing unit 211 is coupled to the first channel L1 and the multiplexer 212. The multiplexer 212 is coupled to the processing unit 211, for use when in a third communication protocol mode, such as a Display Port protocol mode, coupling the second channel L2 to the processing unit 211, and when in the first communication protocol mode, coupling the second channel L2 to a ground, according to the disable signal DS.

The embedded control unit EC1 is coupled to the multiplexer 212. The multiplexer 212 can couple the second channel L to the embedded control unit EC1 according to the enable signal ES, such that the embedded control unit EC1 can communicate with an electronic device such as the electronic device 120, in the second communication protocol mode via the second channel L2. In the embodiments, the processing unit 211 or other internal devices in the host electronic device 210 can output the enable signal ES or the disable signal DS to the controller node of the multiplexer 212 based on a detection signal TS. In some embodiments, the enable signal ES and the disable signal DS are output from the electronic device 220, and the detection signal TS can contain the enable signal ES and the disable signal DS.

The host electronic device 210 may determine whether the electronic device 220 is the electronic device 221 having a display port interconnection unit, or the electronic device 222 or the electronic device 120 having the thunderbolt unit, based on the detection signal TS output by the electronic device 220 via the mDP bus BS. Further, the host electronic device 210 may selectively open or disconnect the second channel L2 via the multiplexer 212. For example, when the electronic device 220 is the electronic device 221 coupled to host electronic device 210, the multiplexer 212 can couple the second channel L2 to the processing unit 211, so that the host electronic device 210 can communicate with the electronic device 220 by a third communication protocol mode, such as a Display Port protocol mode, via the second channel L2 and the first channel L1 (i.e. the channels LANE0~LANE3).

When the electronic device 220 is the electronic device 222 coupled to host electronic device 210, the multiplexer 212 can couple the second channel L2 to the ground based on the detection signal DS, so that the host electronic device 210 can disconnect the second channel L2. The host electronic device 210 can communicate with the electronic device 220 in the first communication protocol mode merely via the first channel L1.

When the electronic device 220 is the electronic device 120 in FIG. 1 and is coupled to host electronic device 210, the multiplexer 212 can couple the second channel L2 to the embedded control unit EC1 according to the enable signal ES, so that the processing unit 211 can communicate with the electronic device 220 in the first communication protocol mode via the first channel L1, and the embedded control unit EC1 can communicate with the electronic device 220 in the second communication protocol mode via the second channel L2.

Figure 3:
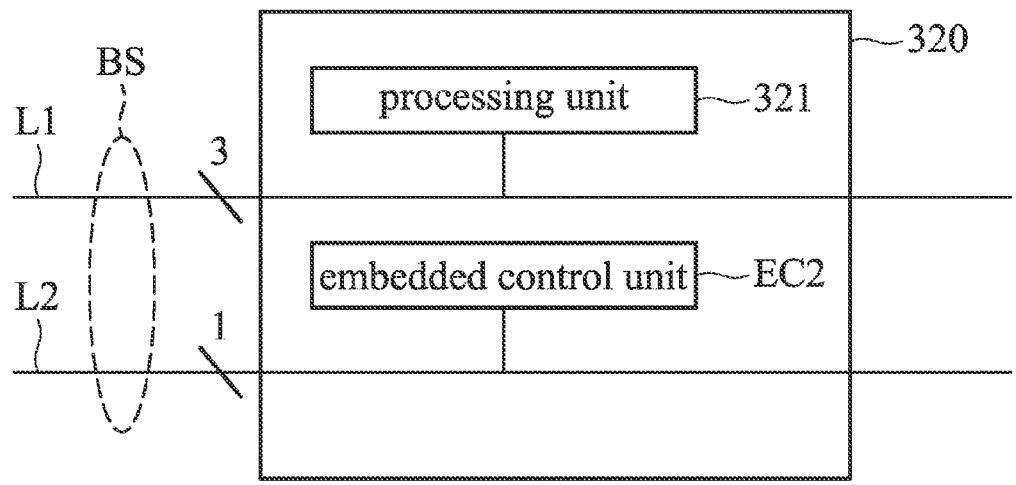
FIG. 3 is a block diagram of an electronic device according to an embodiment of the invention.

FIG. 3 is a block diagram of an electronic device according to an embodiment of the invention, with the electronic device 320 identical to the electronic device 120 in FIG. 1. As illustrated in FIG. 3, the electronic device 320 includes a processing unit 321 and an embedded control unit EC2. The processing unit 321 is coupled to the first channel L1 of the mDP bus BS to output the detection signal TS to the host electronic device such as the host electronic device 210 and communicate with the host electronic device in the first communication protocol mode. The embedded control unit EC2 is coupled to the second channel L2 to communicate with the host electronic device in the second communication protocol mode.

Figure 4:
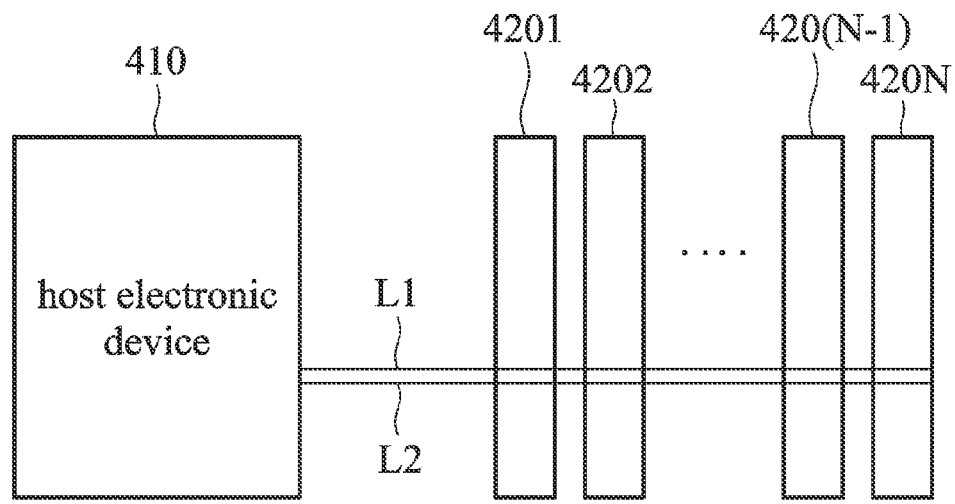
FIG. 4 is a block diagram of an electronic system according to an embodiment of the invention.

FIG. 4 is a block diagram of an electronic system according to an embodiment of the invention. As shown in FIG. 4, the electronic system 400 includes the host electronic device 410 and a plurality of the electronic devices 4201~420N. Each of the electronic devices 4201~420N may be the electronic device 320. The host electronic device 410 may be the host electronic device 210. The electronic device 4202 is coupled to the electronic device 4201 in the daisy chain configuration, and the electronic device 420N is coupled to the electronic device 420 (N−1) in the daisy chain configuration. Each of the electronic devices 4201~420N and the host electronic device has a mini display port connection unit connecting to the mDP bus BS. The host electronic device 410 can communicate with the electronic device 420N in the first communication protocol mode via the first channel L1, and communicate with the electronic device 420N in the second communication protocol mode via the second channel L2.

Figure 5:
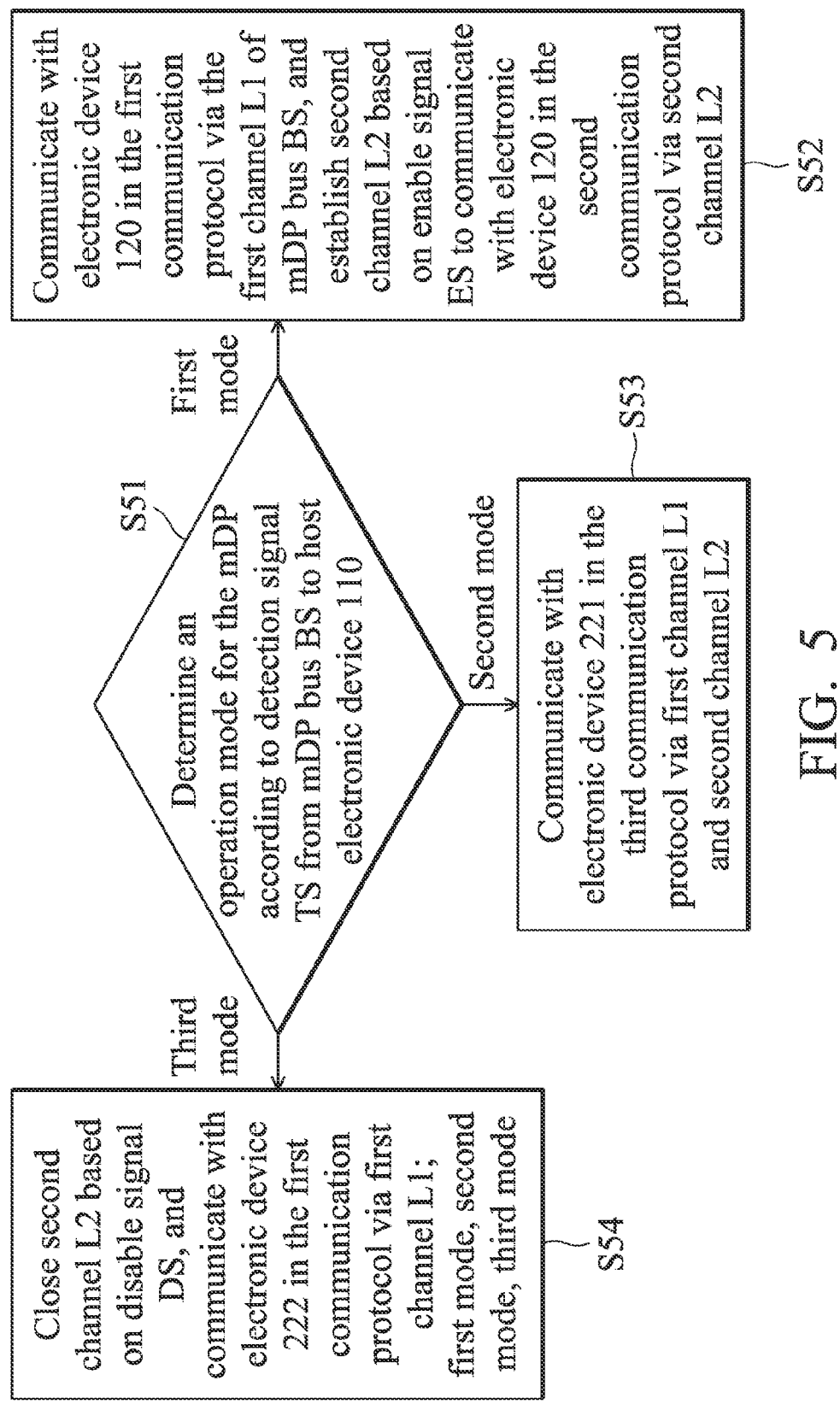
FIG. 5 is a flowchart of a communication method according to an embodiment of the invention.

FIG. 5 is a flowchart of a communication method according to an embodiment of the invention, adopted by the host electronic device 110 coupled to the mDP bus BS. As depicted by FIG. 5, the communication method includes the following steps.

In Step S51, the host electronic device 110 can determine an operation mode for the mDP bus BS as being one of the first, second, and third modes according to the detection signal TS output from the mDP bus BS to the host electronic device 110.

In Step S52, when the mDP bus BS is in the first mode, the host electronic device 110 can communicate with the electronic device 120 in the first communication protocol mode via the mDP bus BS, open the second channel L2 of the mDP bus BS based on the enable signal ES, and communicate with the electronic device 120 in the second communication protocol mode via the second channel L2.

In Step S53, when the mDP bus BS is in the second mode, the host electronic device 110 can communicate with the electronic device 221 by the third communication protocol mode via the first channel L1 and second channel L2.

In Step S54, when the mDP bus BS is in the third mode, the host electronic device 110 can disconnect the second channel L2 based on the disable signal DS, and communicate with the electronic device 222 in the first communication protocol mode via the first channel L1.

Moreover, the electronic device 4202 or the electronic device 420N can be coupled to the electronic device 4201 or the electronic device 420(N−1) by the daisy chain configuration, so that the host electronic device 410 can communicate with the electronic device 4202 or the electronic device 420N in the first communication protocol mode via the first channel L1, and communicate with the electronic device 4202 or the electronic device 420N in the second communication protocol mode via the second channel L2.

Figure 6:
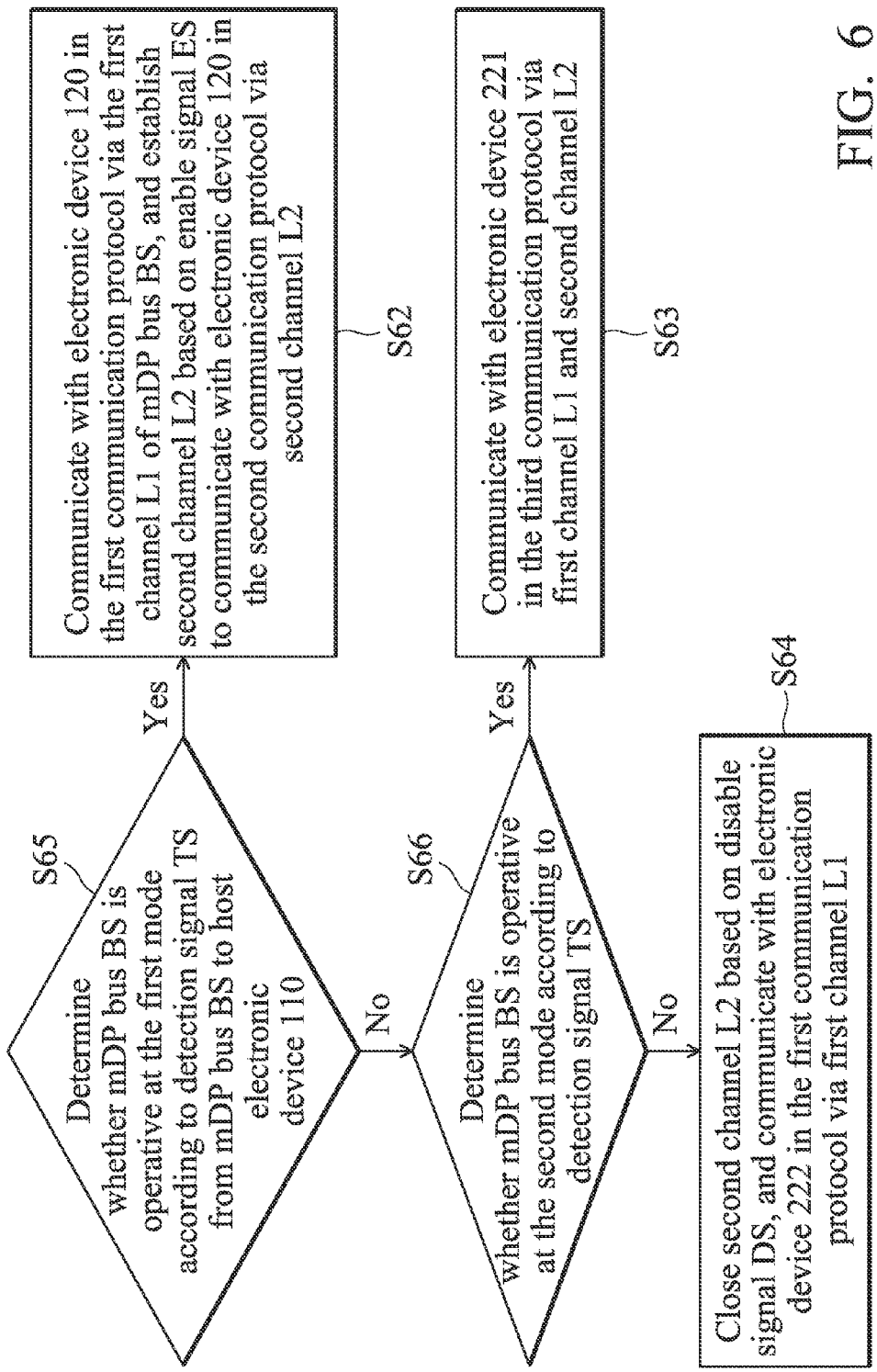
FIG. 6 is a flowchart of a communication method according to another embodiment of the invention.

FIG. 6 is a flowchart of a communication method according to another embodiment of the invention. The communication method in FIG. 6 is similar to that in FIG. 5, wherein Steps S62~S64 are identical to Steps S52~S54. The two communication methods are distinct in that in Step S65, the host electronic device 110 can determine whether the mDP bus BS is in the first mode based on the detection signal TS output from the mDP bus BS to the host electronic device 110. When the mDP bus BS is in the first mode, Step S62 is performed. When the mDP bus BS is not in the first mode, Step S66 is performed, wherein the host electronic device 110 can determine whether the mDP bus BS is in the second mode based on the detection signal TS. When the mDP bus BS is in the second mode, Step S63 is performed. When the mDP bus BS is not in the second mode, the host electronic device 110 can determine that the mDP bus BS is in the third mode, thus Step S64 is performed.

In the embodiments, under the thunderbolt protocol mode, the electronic system 100 can perform data transmission using an unused channel such as the second channel L2 by the internal integrated circuit bus. Consequently the host electronic device 110 can perform data transmission between the internal integrated circuit bus and the electronic device 120 by the mDP bus BS without the need for an additional bus.

As used herein, the term "determining" encompasses calculating, computing, processing, deriving, investigating, looking up (e.g., looking up in a table, a database or another data structure), ascertaining and the like. Also, "determining" may include resolving, selecting, choosing, establishing and the like.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any commercially available processor, controller, microcontroller or state machine.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the invention shall be defined and protected by the following claims and their equivalents.

What is claimed is:

1. An electronic system, comprising:
a host electronic device, coupled to a Mini Display Port (mDP) bus comprising a first channel and a second channel, wherein when in a first communication protocol mode, the host electronic device disconnects the second channel according to a disable signal; and
a first electronic device, coupled to the mDP bus and configured to output a detection signal to the host electronic device,
a multiplexer, coupled to the a first processing unit, and configured to couple the second channel to the first processing unit in the third communication protocol mode, and couple the second channel to a ground based on the disable signal in the first communication protocol mode;
wherein when the first electronic device is coupled to the host electronic device, the host electronic device communicates with the first electronic device in the first communication protocol mode via the first channel, and communicates with the first electronic device in the second communication protocol mode via the second channel according to an enable signal; and
when a second electronic device is coupled to the host electronic device, the host electronic device communicates with the second electronic device in a third communication protocol mode via the second channel, wherein each of the first communication protocol mode, the second communication protocol mode, and the third communication protocol mode is a different communication protocol mode than the other two.

2. The electronic system as claimed in claim 1, wherein when a third electronic device is coupled to the host electronic device, the host electronic device disconnects the second channel according to the disable signal, and communicates with the third electronic device in the first communication protocol mode via the first channel.

3. The electronic system as claimed in claim 1, wherein the host electronic device comprises:
the first processing unit, coupled to the first channel; and
a first embedded control unit, coupled to the multiplexer, wherein the multiplexer is configured to couple the second channel to the first embedded control unit based on the enable signal, so that the first embedded control unit can communicate with the first electronic device in the second communication protocol mode via the second channel.

4. The electronic system as claimed in claim 1, further comprising:
a fourth electronic device, coupled to the first electronic device with a daisy chain configuration, wherein the host electronic device is configured to communicate with the fourth electronic device in the first communication protocol mode via the first channel, and communicate with the fourth electronic device in the second communication protocol mode via the second channel.

5. A host electronic device, comprising:
a processing unit, coupled to a first channel of an mDP bus;
a multiplexer, configured to couple a second channel of the mDP bus to a ground level based on a disable signal in a first communication protocol mode; and
an embedded control unit, coupled to the multiplexer, wherein when the host electronic device is coupled to a first electronic device, the multiplexer is configured to couple the second channel to the embedded control unit according to an enable signal, so that the processing unit is configured to communicate with the first electronic device in the first communication protocol via the first channel, and the embedded control unit is configured to communicate with the first electronic device in a second communication protocol mode via the second channel; and
when a second electronic device is coupled to the host electronic device, the multiplexer is configured to couple the second channel to the processing unit, so that the processing unit is configured to communicate with the second electronic device in a third communication protocol mode via the second channel and the first channel, wherein each of the first communication protocol mode, the second communication protocol mode, and the third communication protocol mode is a different communication protocol mode than the other two.

6. The host electronic device of claim 5, wherein when a third electronic device is coupled to the host electronic device, the multiplexer is configured to couple the second channel to a ground level according to a disable signal, and the processing unit is configured to communicate with the third electronic device in the first communication protocol mode via the first channel.

7. A communication method, adopted by a host electronic device coupled to an mDP bus, the communication method comprising:
    determining an operation mode for the mDP bus according to a detection signal output from the mDP bus to the host electronic device; and
    when the mDP bus is in a first mode, communicating with a first electronic device in a first communication protocol mode via a first channel of the mDP bus, and turning on a second channel of the mDP bus through a multiplexer according to an enable signal input as a select signal of the mulitplexer, thereby communicating with the first electronic device in a second communication protocol mode via the second channel; and when the mDP bus is in a second mode, utilizing the multiplexer to communicate with a second electronic device in a third communication protocol mode via the first channel and the second channel.

8. The communication method of claim 7, further comprising:
    when the mDP bus is in a third mode, disconnecting the second channel according to a disable signal, and communicating with a third electronic device in the first communication protocol mode via the first channel.

9. The communication method of claim 7, further comprising:
    coupling a fourth electronic device to the first electronic device having a daisy chain configuration, so that the host electronic device is configured to communicate with the fourth electronic device in the first communication protocol mode via the first channel, and communicate with the fourth electronic device in the second communication protocol mode via the second channel.

* * * * *